US009672749B1

(12) United States Patent
Samuthirapandian et al.

(10) Patent No.: US 9,672,749 B1
(45) Date of Patent: Jun. 6, 2017

(54) SYSTEM AND METHOD FOR UPDATING ILS CATEGORY AND DECISION HEIGHT

(71) Applicant: HONEYWELL INTERNATIONAL INC., Morris Plains, NJ (US)

(72) Inventors: Subash Samuthirapandian, Tamilnadu (IN); John G Suddreth, Cave Creek, AZ (US); Troy Nichols, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/094,143

(22) Filed: Apr. 8, 2016

(51) Int. Cl.
G08G 5/02 (2006.01)
B64D 45/08 (2006.01)

(52) U.S. Cl.
CPC ............. G08G 5/025 (2013.01); B64D 45/08 (2013.01)

(58) Field of Classification Search
CPC .................................. G08G 5/025; B64D 45/08
USPC .......................................................... 701/17
See application file for complete search history.

(56) References Cited

U.S. PATENT DOCUMENTS

| 6,405,107 | B1* | 6/2002 | Derman | G01C 21/005 340/3.5 |
| 6,690,299 | B1* | 2/2004 | Suiter | G01C 23/005 340/973 |
| 8,035,547 | B1* | 10/2011 | Flanigan | G01C 23/005 244/3.1 |
| 8,918,271 | B2* | 12/2014 | Pendry | G08G 5/0034 244/158.1 |
| 8,970,399 | B1 | 3/2015 | Zimmer et al. | |
| 9,002,544 | B1 | 4/2015 | Seah et al. | |
| 9,041,560 | B2 | 5/2015 | Venkataswamy et al. | |
| 9,527,601 | B2* | 12/2016 | Wyatt | G08G 5/0021 |
| 2011/0264313 | A1 | 10/2011 | Sampath | |
| 2012/0209458 | A1 | 8/2012 | Sampath | |
| 2014/0277857 | A1* | 9/2014 | Bourret | G08G 5/0013 701/17 |

OTHER PUBLICATIONS

Sindlinger, A. et al.; Automated Notam Processing for a Graphical and Textual Integration on Data Link Equipped Aircraft; 2010 Integrated Communications Navigation and Surveillance (ICNS) Conference; May 11-13, 2010.
Zimmer, N. et al.; Rule-Based Notam & Weather Notification; 2011 Integrated Communications Navigation and Surveillance (ICNS) Conference May 10-12, 2011.
Feyereisen, T. et al.; Smartview Lower Minimums: A Synthetic Vision Guidance System; 34th Digital Avionics Systems Conference; Sep. 13-17, 2015.

* cited by examiner

Primary Examiner — McDieunel Marc
Assistant Examiner — James E Stroud
(74) Attorney, Agent, or Firm — Lorenz & Kopf, LLP

(57) ABSTRACT

A system and method is provided for updating an aircraft flight management system with approach and landing information received from a NOTAM transmission. The system and method receives an updated ILS category, updates the ILS category and updates the associated decision height/ altitude. In addition, the system and method generates a notification of the NOTAM update and disregards user attempts to select an ILS category and/or decision height that is inconsistent with the NOTAM update.

15 Claims, 5 Drawing Sheets

SYSTEM AND METHOD FOR UPDATING ILS CATEGORY AND DECISION HEIGHT

TECHNICAL FIELD

Embodiments of the subject matter described herein relate generally to vehicle navigation systems and, more particularly, to an aircraft navigation system that updates approach and landing information responsive to a digital notice to airmen (NOTAM).

BACKGROUND

As a pilot navigates an aircraft along a flight path, the pilot receives and integrates navigational information from a variety of sources. The flight path is generally broken into a series of or phases of flight, each of which have specific issues that require a pilot's attention. As an example, during an approach and landing phase, the pilot must be aware of a specified lowest height or altitude (referred to as a decision height/altitude) at which, if a required visual marker is not visible to the pilot, the pilot must initiate a missed approach flight operation.

An instrument landing system (ILS) is a source of navigational information relevant to approach and landing an aircraft. Specifically, the ILS is a radio navigation system that may enable the pilot to complete an approach and landing phase, even when unable to view the required visual marker. The ILS comprises several numbered ILS categories organized such that the decision height generally decreases as the ILS category number increases. Because approach and landing phases involve operating the aircraft quite near the ground, the signal quality of the ILS is of utmost importance. Therefore, when ILS signal quality is determined to be poor, an aircraft's assigned ILS category may be downgraded to a lower ILS category number (thereby increasing the decision height), in an abundance of caution. For example, a category three (CAT III) may be downgraded to a CAT II or CAT I. Similarly, a CAT II may be downgraded to CAT I. ILS signal quality may be downgraded for reasons such as signal blockage or multipath interference, change in the reflection properties from dry sand soil to a wet ground of the ground surface, environmental hazards, and the like. If and when signal quality improves, the ILS category and corresponding decision height/altitude may be upgraded to a higher number ILS category. The downgrades and upgrades to ILS category numbers are collectively referred to as ILS updates.

Whenever there is an update to the ILS category, pilots are notified via a digital notice to airmen, (NOTAM). In response to the NOTAM providing an updated ILS category or decision height/altitude, a pilot is generally expected to set the updated ILS category and decision height/altitude on the aircraft flight management system. Although a rare occurrence, if the updated ILS category and decision height/altitude is not set by pilot, an undesirable effect on the aircraft could result.

Accordingly, a system and method for updating the aircraft flight management system to reflect a NOTAM approach or landing update is desirable. The desired system and method detects an updated ILS category, updates the ILS category and decision height/altitude in the flight management system, and notifies a pilot or crew thereof. The desired system and method additionally disregards a pilot attempt to select an ILS category that is inconsistent with the NOTAM ILS category, thereby improving overall aircraft safety.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A processor implemented method of updating information on an aircraft flight management system is provided. The processor implemented method comprises receiving a notice to airmen (NOTAM) comprising an updated instrument landing system (ILS) category; and when the updated ILS category is different from a first ILS category, disregarding a user attempt to select an ILS category inconsistent with the updated ILS category, and generating a notification of the NOTAM update.

Another processor implemented method of updating information on an aircraft flight management system is provided. The processor implemented method comprises: receiving a notice to airmen (NOTAM) comprising an updated instrument landing system (ILS) category and an updated decision height; and comparing the updated ILS category to the first ILS category; and when the updated ILS category is different from the first ILS category, displaying the updated ILS category in a first field on a display device, displaying the updated decision height in a second field on the display device, and generating a notification of the NOTAM update.

Also provided is a system for updating information on an aircraft flight management system, comprising: a display device; a source of notice to airmen (NOTAM); a processor coupled to the display device and the source of NOTAM, the processor configured to receive a NOTAM comprising an updated instrument landing system (ILS) category; and when the updated ILS category is different from the first ILS category, command the display device to display the updated ILS category in a first field on the display device, and generate a notification of the NOTAM update.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
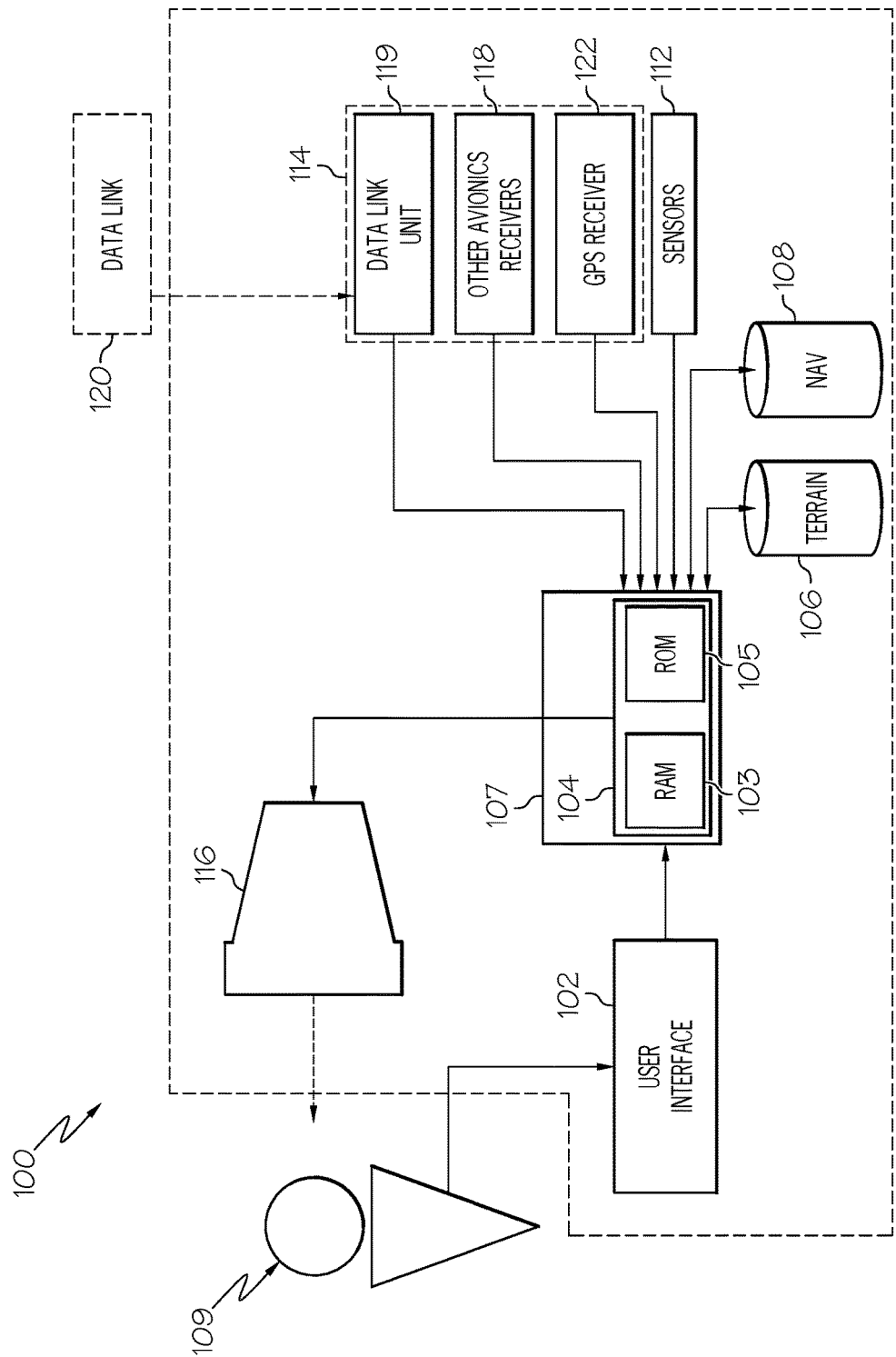
FIG. 1 is a block diagram for an ILS update and notification system, in accordance with an exemplary embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Operations, tasks, and functions are sometimes referred to as being a set of "instructions;" such instructions may be stored in memory or a database and then processor-executed, computer-executed, computerized, software-implemented, or computer-implemented. The instructions may also be converted into hardware using logic gates and/or a field programmable gate array (FPGA).

In the provided example, one processor is described; however, in practice, one or more processing devices may be distributed on-board a vehicle (such as, in a flight management system of an aircraft) or externally, and may cooperatively carry out the described operations, tasks, and functions by manipulating electrical signals representing data bits at memory locations in the system memory, as well as other processing of signals. Similarly, memory is described below as comprising one random access memory (RAM) and one read only memory (ROM), but, in practice, the memory may comprise multiple devices and may be distributed on-board or external to the vehicle. The memory locations where data bits are maintained are physical locations that have particular electrical, magnetic, optical, or organic properties corresponding to the data bits.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more processors or other control devices. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein.

As an overview, when air traffic control (ATC) initiates an aircraft approach and landing change, such as a downgrade in the assigned ILS category, pilots are notified via digital NOTAMs (also referred to as D-NOTAMs, or simply, NOTAMs). The transmission of a digital NOTAM comprising an ILS update is referred to as "publishing" an updated ILS category and/or updated decision height/altitude. In response to the updated ILS category and updated decision height/altitude, a pilot is typically expected to revise the ILS category and/or decision height/altitude on the flight management system. Although a rare occurrence, if the ILS category and decision height/altitude of the host aircraft is not revised to the NOTAM updated values by the pilot, an undesirable effect on the aircraft could result. The below provided ILS update and notification system 107 provides a solution to this issue; in addition, it may update the ILS category and decision height responsive to its continuous evaluation of aircraft flight status, safety, regulatory compliance, performance ramifications, anomalies, threats, and the like.

As will be described in more detail below, when the provided ILS update and notification system 107 receives a NOTAM that provides an updated ILS category (wherein an update comprises a downgrade or an upgrade), it (1) updates the flight management system, (2) updates the display of approach and landing information on the display device, and (3) notifies a pilot or crew thereof. Consequently, the proposed invention enables a pilot to employ the correct approach category and decision height, responsive to the NOTAM, and robust against user attempts to change it therefrom.

Referring now to FIG. 1, an ILS update and notification system 107 is depicted within an aircraft display system 100. The aircraft display system 100 includes a user interface 102, a display device 116, and a processor 104. The user interface 102 is in operable communication with the processor 104 and is configured to receive input from a user 109 (e.g., a pilot) and, in response to the user input, supply command signals to the processor 104. The user interface 102 may comprise any combination of various known user interface devices, such as: a voice recognition device, a gesture recognition device, a keyboard, a touch sensitive screen, and a cursor control device, such as a mouse, trackball, joystick, or combination of buttons, switches, or knobs configured to perform cursor control and to generate user input for the processor 104. In some embodiments the user interface 102 and the display device 116 may be combined, for example, as a touch sensitive screen.

The display device 116 is in operable communication with the processor 104 and may be implemented using any one of numerous known display devices suitable for rendering textual, graphic, and/or iconic information in a format viewable by the user 109. Non-limiting examples include various cathode ray tube (CRT) displays, and various flat panel displays such as various types of LCD (liquid crystal display) and TFT (thin film transistor) displays. The display device 116 may be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

In practice, processor 104 may comprise, or be associated with, any suitable number of individual microprocessors, flight control computers, navigational equipment, memories (such as RAM 103 and ROM 105), power supplies, storage devices (such as databases 106 and 108), interface cards, and other standard components known in the art. In this respect, the processor 104 may include or cooperate with any number of software models, software programs (e.g., aircraft display programs) or instructions stored in memory and designed to carry out the various methods, process tasks, calculations, and control/display functions described below. Accordingly, processor 104 may be distributed and reside within one or any combination of: an onboard maintenance system, a mobile electronic device, and a stationary location, such as a ground station; when the processor of the aircraft display system 100 comprises distributed components, a synchronization process may be performed to assure that communication is synchronized.

Referring again to FIG. 1, the aircraft display system 100 the processor 104 is also in operable communication with one or more terrain/airport databases 106, one or more navigation databases 108, sensors 112, and external data sources 114. The terrain/taxiway database 106 includes various types of geographic data representative of the surface over which the aircraft is taxing, or the terrain over which the aircraft is flying; the navigation database 108 includes flight-plan related data, such as, waypoints, distances between waypoints, headings between waypoints, navigational aids, obstructions, special use airspace, political boundaries, communication frequencies, and aircraft approach information. Although the terrain/taxiway database 106 and the navigation database 108 are depicted as separate from the processor 104, the contents of either or both of these databases 106, 108 could be loaded into the RAM 103, or integrally formed as part of the processor 104, and/or RAM 103, and/or ROM 105. Similar to the memory devices (RAM 103 and ROM 105), the terrain/taxiway database 106 and navigation database 108 could also be part of a device or system that is external to the aircraft display system 100.

The sensors 112 are distributed around an aircraft and provide aircraft state data. The aircraft state data includes the geographic position of the aircraft, aircraft speed, aircraft heading, aircraft altitude, and aircraft attitude, as well as the status of aircraft subsystems such as engines, electronic systems, cabin control systems, and the like. Any sensor technology now in use or developed in the future may be used to implement the sensors 112. In practice, the composition of the sensors 112 may vary to provide different portions of the aircraft state data.

The number and type of external data sources 114 (or subsystems) coupled to the ILS update and notification system 107 may vary, but an embodiment comprises a GPS receiver 122, "other avionics receivers" 118, and a data link 119. Variously, the other avionics receivers may comprise: a terrain avoidance and warning system (TAWS); a traffic and collision avoidance system (TCAS); a runway awareness and advisory system (RAAS); a flight director; and a navigation computer.

The GPS receiver 122 may be a multi-channel receiver, with each channel tuned to receive one or more of the GPS broadcast signals transmitted by a respective GPS satellite (not illustrated) orbiting the earth. The GPS system generally operates as follows. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines GPS data such as, aircraft position, aircraft groundspeed, and aircraft ground track angle. In an embodiment, the GPS receiver 122 additionally determines an aircraft glide slope deviation and provides it to the processor 104. In other embodiments, the processor 104 determines, based on the provided GPS data, aircraft glide slope.

Referring back to FIG. 1, the processor 104 is additionally in operable with onboard data link 119, which is coupled to external data link 120. Onboard data link 119 and external data link 120 are cooperatively configured to receive data at the host aircraft that is transmitted by sources external to the host aircraft, such as ground stations and other aircraft. Examples of data received from sources external to the host aircraft include Automatic Dependent Surveillance-Broadcast (ADS-B) information, weather information, traffic information, and route changes. Pertinent to this application, onboard data link 119 receives, from external data link 120, clearances, revisions, and alerts (including D-NOTAMS), associated with potentially hazardous situations including degraded signal quality.

Generally, the aircraft display system 100 functions as follows. Turning first to the processor 104, regardless of its' specific implementation, it is in operable communication with the components described hereinabove. The processor 104 is configured to continuously receive aircraft state data (such as inertial data and geographic position data) from the sensors 112 and environment-related data from the external data sources 114. The processor 104 is configured, in response to the aircraft state data, to selectively retrieve terrain data from one or more of the terrain/airport databases 106 and navigation data from one or more of the navigation databases 108, and to supply appropriate display commands to the display device 116.

In addition, the processor 104 is configured to continuously process the current flight status data for the host aircraft. The current flight status data comprises data from the sensors 112, the external data sources 114, and the data link 120. Other sources of flight status data (not shown) may include line replaceable units (LRUs), transducers, accelerometers, instruments, and the like. Accordingly, flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The processor 104 is suitably designed to process flight status data and generate display device 116 commands therefrom.

Responsive to commands from processor 104, the display device 116 displays images on the display device 116. Images may comprise two or three dimensional renderings of geographic ground information, environmental information, neighboring aircraft traffic, command and control menus, and the like. Flight control information may be presented as a graphical user interface with a series of flight management windows, each having a series of interactive menus or pages. The display device 116 is configured to receive commands originating from the user interface 102 and processed by the ILS update and notification system 107, and to respond by selectively rendering various types of textual, graphic, and/or iconic information. Examples of images and information displayed on the display device 116 are described in connection with FIGS. 3-5.

Thus, an aircraft display system 100 having an ILS update and notification system 107 has been generally described in terms of its components and functions. Next, a process for an ILS update and notification system 107, in accordance with an exemplary embodiment, is described.

During navigation, a pilot may navigate, via the user interface 102 and the display device 116, through displayed flight management windows to a "landing page." As used herein, the "landing page" is a graphical user interface (GUI) having aircraft approach and landing information. For example, the landing page may comprise a field for displaying the ILS category (first field), and a field for displaying a decision height/altitude (second field). A first ILS category may be displayed in the first field. A first decision height/altitude may be displayed in the second field. Depending on the context, the first ILS category and the first decision height may have been preset prior to departure, may be a default setting, or may represent a setting entered, via the user interface 102, at some point prior to the reception of the relevant NOTAM.

Figure 2:
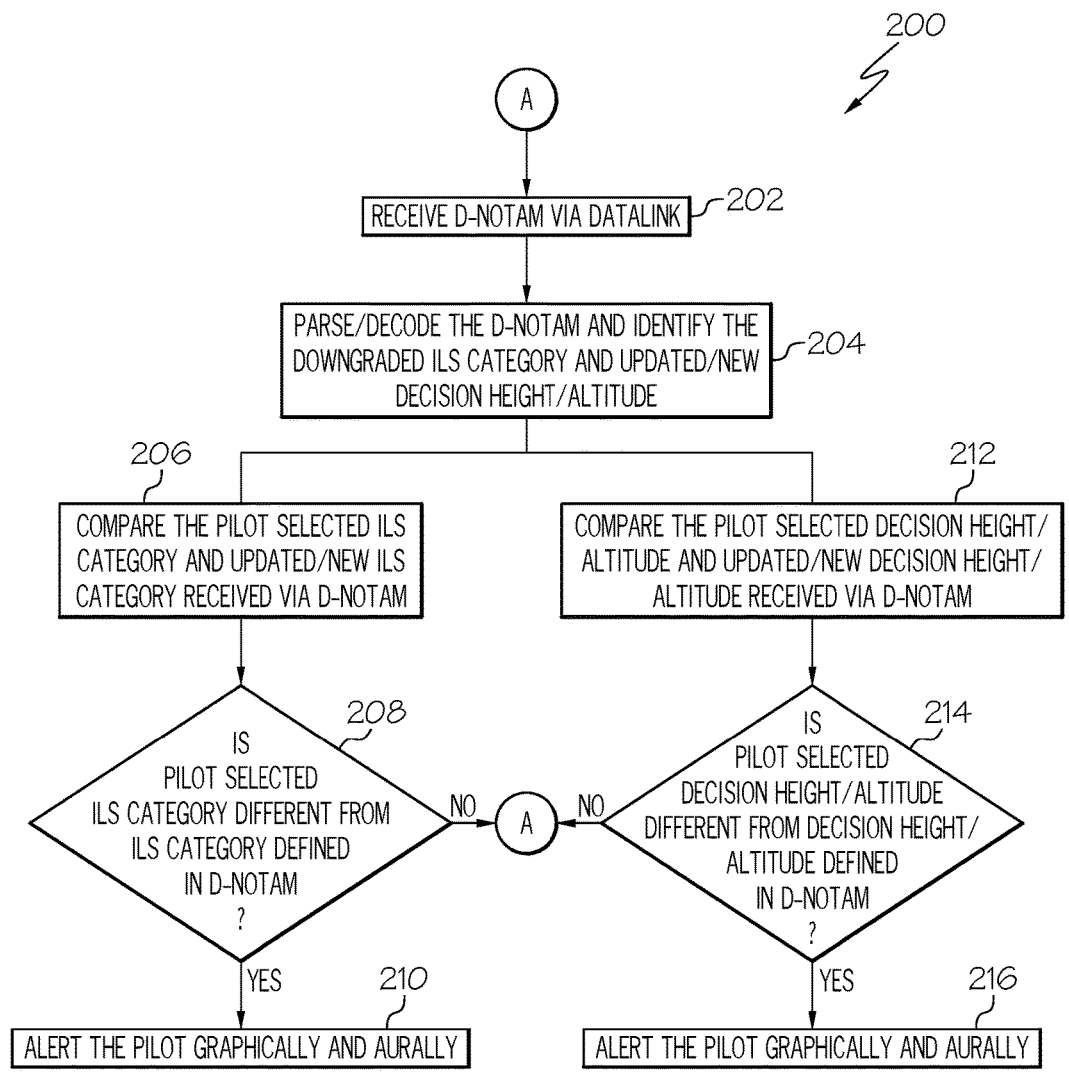
FIG. 2 is a flow chart of a process for an ILS update and notification system, in accordance with the exemplary embodiment.

When a NOTAM is received via data link 120, the process 200 for an ILS update and notification system 107 is started. Turning to FIG. 2, At STEP 202 a NOTAM is received via data link 120. The processor 104 determines when there is an updated ILS category and when there is an updated decision height by parsing and decoding the NOTAM to identify an updated ILS category and updated decision height/altitude (STEP 204). The processor 104 compares the updated ILS category to a first ILS category in STEP 206. In STEP 208, the processor determines whether the updated ILS category is different from the first ILS category. When the updated ILS category is different from the first ILS category, the processor 104 (1) disregards a user attempt to select an ILS category inconsistent with the updated ILS category, and (3) generates a notification of the NOTAM updated ILS category (STEP 210). Notification of the updated ILS category may comprise aural and/or visual alerts, examples of which are described in connection with FIGS. 4-5.

The processor 104 may additionally display the updated ILS category in the first field on the display device 116 in (STEP 210). At some point after the updated ILS category is displayed in the first field, the pilot or crew may attempt to select an ILS category inconsistent with the updated ILS category. A pilot or crew attempt to select an ILS category inconsistent with the updated ILS category generally proceeds as follows. The pilot or crew may manipulate the user interface 102 to select the first field on the display device 116, causing the processor 104 to receive a (first) user input. Responsive to the first user input, the processor 104 may command the display device 116 to display, at the first field, a menu of options associated with the first field (see FIG. 4, first field 302, menu 402 of options, which comprises the ILS categories 1 through 3). Next, the user may select a menu option by again manipulating the user interface 102 (the second user input) to move the cursor symbol, reflecting the user selected menu option. The user selected menu option is then received by the processor 104. In response to the second user input indicating a selected menu option that is inconsistent with the updated ILS category, processor 104 may display a cursor symbol on the user selected menu option (see FIG. 4, cursor symbol 306), or use other techniques to visually indicate the selected menu option, but processor 104 disregards the user attempt to select an ILS category inconsistent with the updated ILS category, and generates a notification of the NOTAM update. The notification may comprise a text message, such as "unavailable category—NOTAM," and/or employ any of a variety of display techniques to create visual distinguishability, such as: highlighting, varying opacity, flashing, varying color, displaying text, enlarging text, and displaying symbols or text alongside a selected menu option. In some embodiments, notification includes an aural alert.

In STEP 212, the processor 104 compares the updated decision height/altitude (simplified herein to "decision height") to the first decision height, and in STEP 214, the processor 104 determines whether the updated decision height is different from the first decision height. When the updated decision height is different from the first decision height, the processor 104 (1) disregards user attempts to select a decision height inconsistent with the updated decision height, and (2) generates a notification of the NOTAM updated decision height (STEP 216). In addition, the processor 104 may display the updated decision height in the second field on the display device 116 at STEP 216. Notification of the updated decision height may comprise aural and/or visual alerts, similar to those described for notification of an updated ILS category, above.

At some point after the updated decision height is displayed in the second field, the pilot or crew may attempt to select a decision height inconsistent with the updated decision height, not having recognized that its contents reflect a NOTAM update. A pilot or crew attempt to select a decision height inconsistent with the updated decision height generally proceeds as follows. The pilot or crew manipulates the user interface 102 to select the second field on the display device 116, causing the processor 104 to receive the user input. Responsive thereto, the processor 104 may command the display device 116 to display a cursor symbol at the second field (see FIG. 5, second field 304, cursor symbol 306). Next, the user may manipulate the user interface 102 in an attempt to change the NOTAM decision height. The user input is received by the processor 104, but the processor 104 disregards the user attempt to select a decision height inconsistent with the updated decision height and displays a notification of the NOTAM. The notification may comprise a text message such as "unavailable decision height—NOTAM," or any of a variety of display techniques to create visual distinguishability, such as: highlighting, varying opacity, flashing, varying color, enlarging text, and displaying symbols or text alongside the second field.

Figure 3:
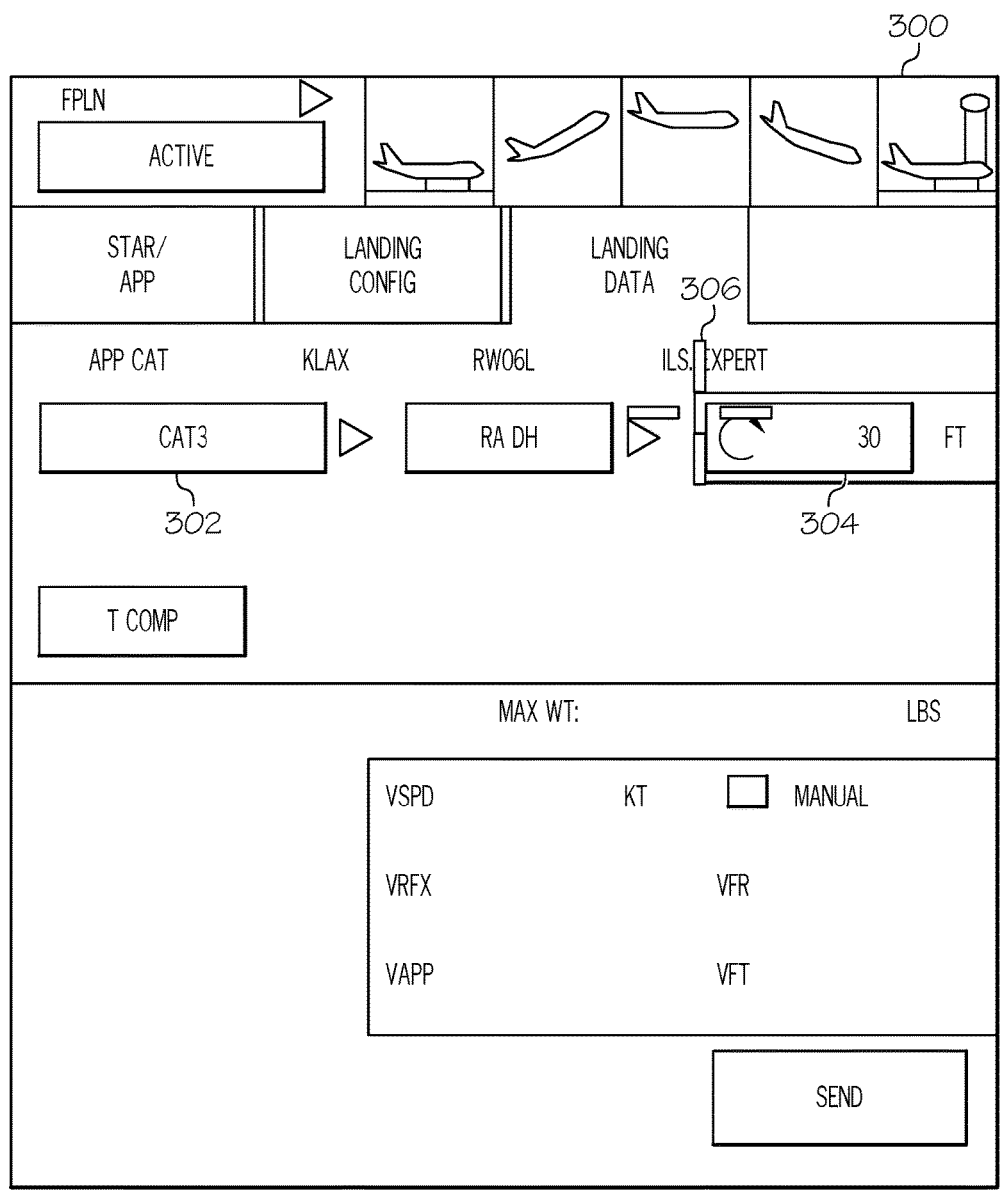
FIG. 3 is an image of a landing page of a flight management system on an aircraft display.
Figure 4:
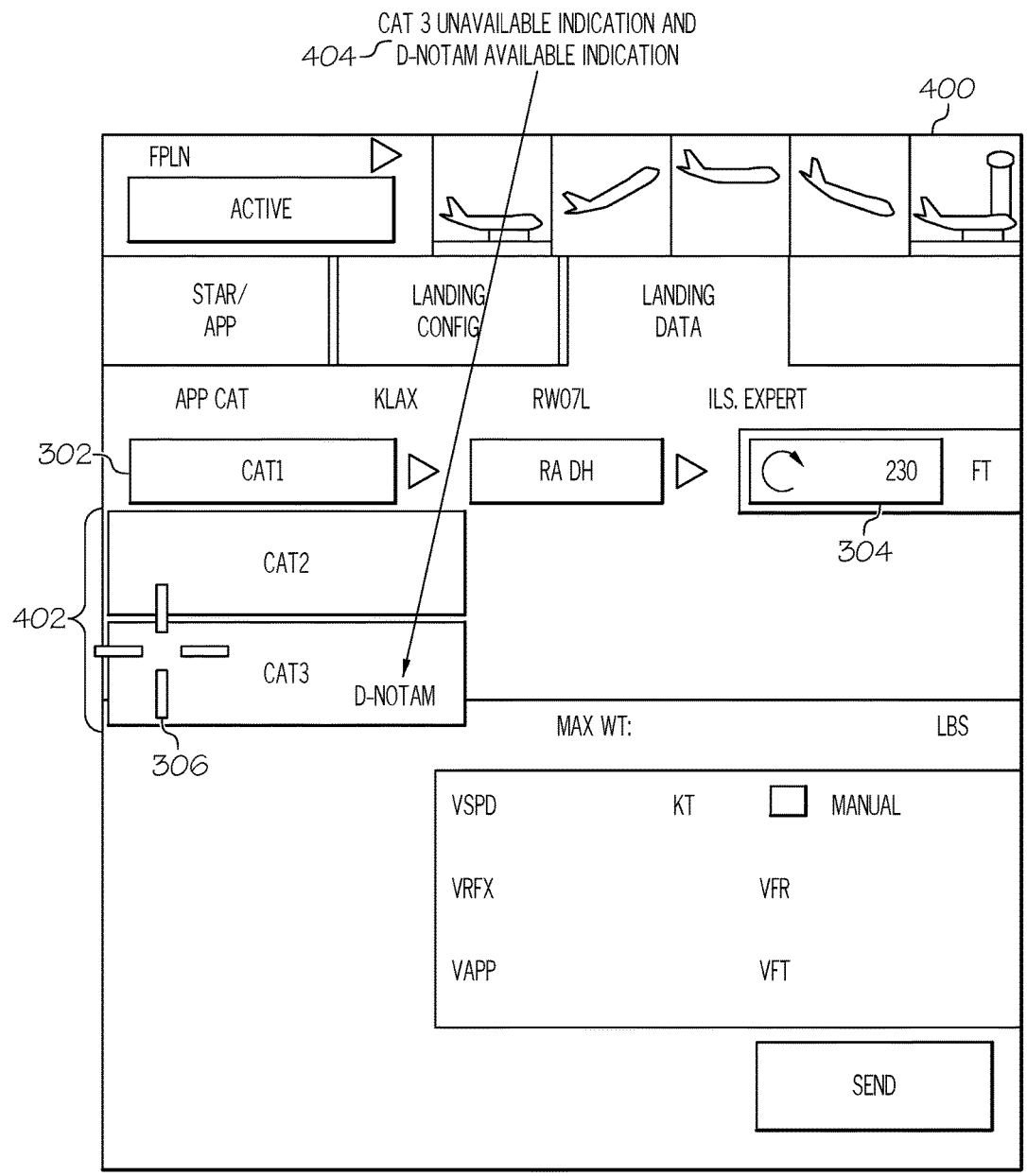
FIG. 4 is an image of a landing page of a flight management system on an aircraft display, showing a notification to an updated ILS category, in accordance with the exemplary embodiment.
Figure 5:
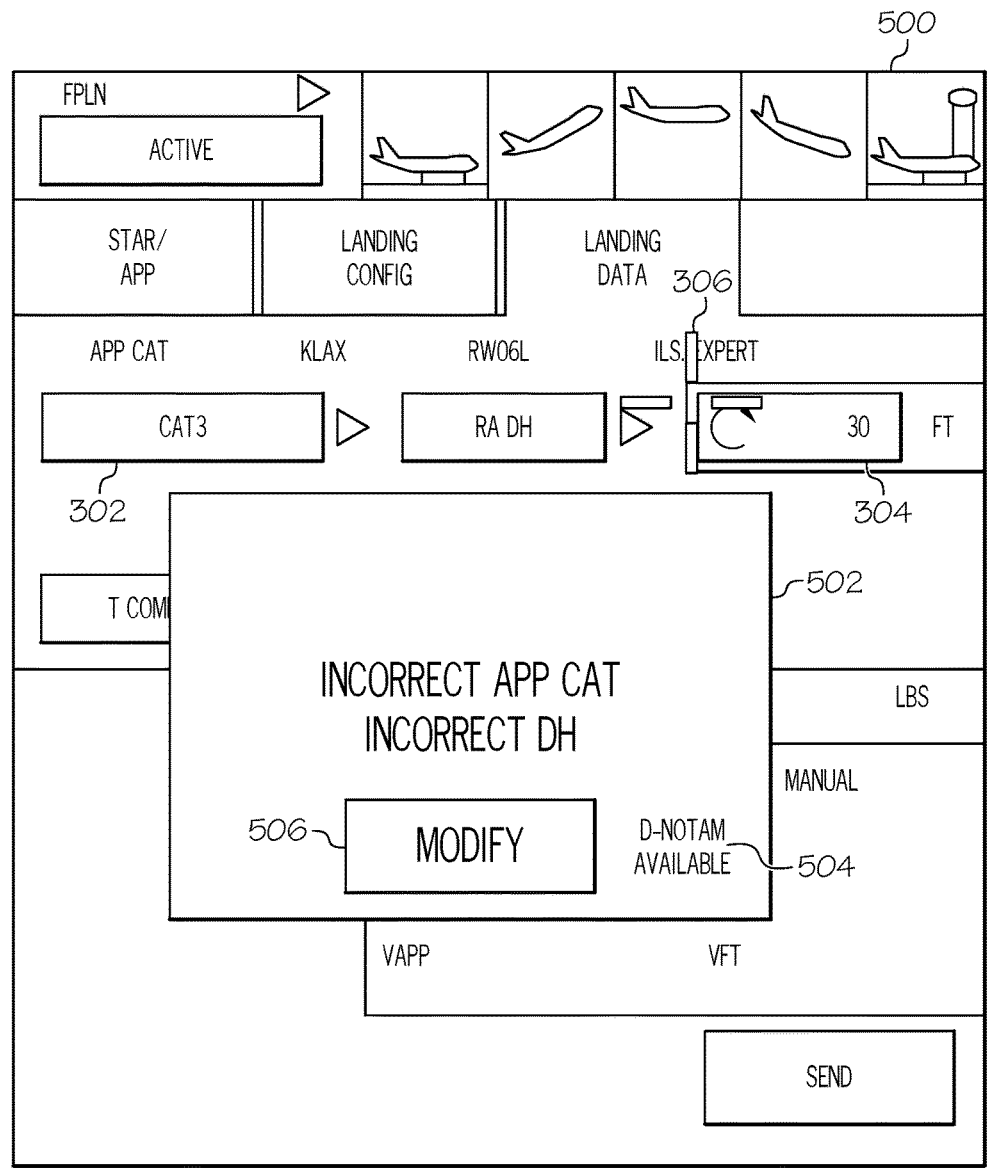
FIG. 5 is an image of a landing page of a flight management system on an aircraft display, showing a notification to an updated ILS category and decision height, in accordance with an exemplary embodiment.

As described above, notification may take a plurality of forms. FIGS. 3-5 are provided to provide context as to what a landing page may look like and how the pilot may be notified, responsive to D-NOTAM approach and landing updates, according to an exemplary embodiment. First, FIG. 3 provides an image of a landing page 300 that may be seen on an aircraft display system prior to a D-NOTAM update. A first field 302 displays "CAT3" indicating that a category 3 ILS is set. A second field 304 displays "30 Ft" which indicates that the decision height/altitude is set to thirty feet. A cursor symbol 306 depicts a cursor location.

Referring now to the landing page 400 shown in FIG. 4, a NOTAM that updates the ILS category to category 1 and updates the decision height/altitude to 230 feet is received (STEPS 202 and 204). Responsive thereto, the ILS update and notification system 107 determines that the updated ILS category is different than the preset ILS category and updates the first field 302 to "CAT 1" indicating that the NOTAM provided update is a downgrade to ILS category 1. Likewise, ILS update and notification system 107 determines that the updated decision height is different than a preset decision height and updates the second field 304 to "230 Ft", indicating that the NOTAM provided update is an increase to 230 feet.

When a user, such as a pilot or crew member, enters user input to attempt to change the ILS category, the cursor symbol 306 moves to indicate the attempt. A menu 402 of ILS category options associated with the first field 302 is displayed; the options being CAT 2 and CAT 3. The location of the cursor symbol 306 indicates that the user attempted to change the first field to CAT 3. Responsive to the user attempt, the text box of the menu 402 that displays the text "CAT 3" is shown having a visual notification 404 overlaid on it, the visual notification comprising the text "D NOTAM." In addition, the notification may include displaying the text box that displays CAT 3 using any of the techniques to create visual distinguishability described herein. The ILS update and notification system 107 disregards the selection if the user selects (via the user interface 102) CAT 3 in spite of the notification. Similarly, the ILS update and notification system 107 disregards a user attempt to change the updated decision height, which a user experiences when the user moves the cursor to select the second field, as described above. As a result, the updated ILS category remains in the first field and the updated decision height remains in the second field, which ensures that the pilot employs the correct (NOTAM updated) ILS category and decision height.

In another embodiment, upon receipt of a D-NOTAM with approach data, a user is notified of the D-NOTAM and notified of an opportunity to modify the first field and the second field accordingly, as shown in FIG. 5. Landing page 500 of a flight management system on an aircraft display system 100 is shown. Again, initially, the first field 302 and second field 304 reflect preset values. The ILS update and notification system 107 notifies the user of the NOTAM updates with notification 502. In the embodiment, notification 502 is overlaid on the landing page 500 in a size, and with techniques to create visual distinguishability, in order to deliberately obscure portions of the landing page. Notification 502 comprises a text box with text 504 indicating that a D-NOTAM is available, as well as displaying enlarged font text stating "Incorrect App Cat Incorrect DH," and providing an opportunity to modify by displaying a menu option stating "modify" 506. In this embodiment, as the user manipulates the user interface to select fields on the landing page 500, the ILS update and notification system 107 prevents selection of an incorrect ILS category and/or the entry of an incorrect decision height in the same manner as described in connection with FIG. 4.

The examples in FIGS. 4-5 are only some of a variety of notification techniques for alerting pilots to NOTAM updated approach information supported by the exemplary embodiment. It is readily appreciated that other techniques may be employed that do not stray from the inventive concept presented herein.

Thus, there has been provided a system and method for updating the aircraft flight management system to reflect approach and landing information changes received from a digital NOTAM update. The provided system and method detects an updated ILS category, updates the ILS category and associated decision height/altitude, and notifies a pilot or crew thereof. The provided system and method additionally disregards a pilot attempt to select an ILS category that is inconsistent with the updated ILS category, thereby improving overall aircraft safety.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A processor implemented method of updating information on an aircraft flight management system, the processor implemented method comprising: receiving a notice to airmen (NOTAM) comprising an updated instrument landing system (ILS) category; and when the updated ILS category is different from a first ILS category, disregarding a user attempt to select an ILS category inconsistent with the updated ILS category, and generating a notification of the NOTAM update; when the updated ILS category is different from the first ILS category, displaying the updated ILS category in a first field on the display device; wherein the NOTAM further comprises an updated decision height; when the updated decision height is different from the first decision height, displaying the updated decision height in a second field on the display device, and disregarding a user attempt to select a decision height inconsistent with the updated decision height.

2. The processor implemented method of claim 1, wherein a user attempt to select an ILS category inconsistent with the updated ILS category comprises:
   receiving, at a user interface, a first user input selecting the first field on the a display device;
   displaying a menu of options associated with the first field in response to the first user input; and
   receiving a second user input selecting one of the menu options.

3. The processor implemented method of claim 2, wherein the user interface comprises at least one from the set including a touchscreen display, a keyboard, a cursor control device, a gesture interpreting device, and a voice commanded device.

4. The processor implemented method of claim 1, wherein a user attempt to select a decision height inconsistent with the updated decision height comprises receiving, at a user interface, a user input selecting the second field on the a display device.

5. The processor implemented method of claim 1, wherein generating a notification comprises at least one display technique from the set including: highlighting, varying opacity, flashing, varying color, displaying text, and enlarging text.

6. The processor implemented method of claim 1, wherein generating a notification comprises (i) displaying text indicating that a NOTAM is available, and (ii) displaying the text "modify".

7. A processor implemented method of updating information on an aircraft flight management system, the processor implemented method comprising: receiving a notice to airmen (NOTAM) comprising an updated instrument landing system (ILS) category and an updated decision height; and comparing the updated ILS category to the first ILS category; and when the updated ILS category is different from the first ILS category, displaying the updated ILS category in a first field on a display device, displaying the updated decision height in a second field on the display device, and generating a notification of the NOTAM update; disregarding a user attempt to select an ILS category inconsistent with the updated ILS category.

8. The processor implemented method of claim 7, wherein a user attempt to select an ILS category inconsistent with the updated ILS category comprises:
receiving, at a user interface, a first user input selecting the first field on the display device;
displaying a menu of options associated with the first field in response to the first user input; and
receiving, at the user interface, a second user input selecting a menu option.

9. The processor implemented method of claim 7, further comprising:
comparing the updated decision height to a first decision height; and
when the updated decision height is different from the first decision height,
displaying the updated decision height in the second field, and
disregarding a user attempt to select a decision height inconsistent with the updated decision height.

10. The processor implemented method of claim 9, wherein a user attempt to select a decision height inconsistent with the updated decision height comprises receiving, at a user interface, user input selecting the second field on the display device.

11. A system for updating information on an aircraft flight management system, comprising: a display device; a source of notice to airmen (NOTAM); a processor coupled to the display device and the source of NOTAM, the processor configured to receive a NOTAM comprising an updated instrument landing system (ILS) category; and when the updated ILS category is different from the first ILS category, command the display device to display the updated ILS category in a first field on the display device, and generate a notification of the NOTAM update; wherein the NOTAM further comprises an updated decision height, and wherein the processor is further configured to, when the updated decision height is different from a first decision height, command the display device to display the updated decision height in a second field on the display device; a user interface configured to provide user input to the processor; and wherein the processor is further configured to command the display device to display ILS category options responsive to a first user input, and disregard a second user input that selects an ILS category that is inconsistent with the updated TLS category.

12. The system of claim 11, wherein the processor is further configured to command the display device to display "D NOTAM", in response to the second user input selecting an ILS category that is inconsistent with the updated ILS category.

13. The system of claim 11, wherein the processor is further configured to disregard user input selecting a decision height that is inconsistent with the updated decision height.

14. The system of claim 13, wherein the processor is further configured to (i) receive user input selecting the second field on the display device, and (ii) command the display device to display a cursor symbol on the second field in response to the user input.

15. The system of claim 11, wherein the processor is further configured to generate an aural alert in response to a user attempt to select an ILS category inconsistent with the updated ILS category.

* * * * *

UNITED STATES PATENT AND TRADEMARK OFFICE
CERTIFICATE OF CORRECTION

PATENT NO. : 9,672,749 B1
APPLICATION NO. : 15/094143
DATED : June 6, 2017
INVENTOR(S) : Samuthirapandian et al.

Page 1 of 1

It is certified that error appears in the above-identified patent and that said Letters Patent is hereby corrected as shown below:

In the Claims

Column 10, Line 48, after the second "the" delete "a"
Column 10, Line 60, after the second "the" delete "a"
Column 12, Line 21, "TLS" should be -- ILS --

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*